United States Patent
Ruiz

(10) Patent No.: US 6,376,926 B1
(45) Date of Patent: Apr. 23, 2002

(54) POWER GENERATION SYSTEM

(75) Inventor: Osvaldo Sánchez Ruiz, San Juan, PR (US)

(73) Assignee: Software & Hardware Security & New Technologies, Inc., San Juan, PR (US)

( * ) Notice: Subject to any disclaimer, the term of this patent is extended or adjusted under 35 U.S.C. 154(b) by 0 days.

(21) Appl. No.: 09/671,440

(22) Filed: Sep. 27, 2000

(51) Int. Cl.[7] .................................................. F02C 6/18
(52) U.S. Cl. .......................... 290/2; 290/1 R; 290/52; 310/306; 136/205
(58) Field of Search .............................. 290/2, 1 R, 52; 310/306, 261, 263, 68 C; 322/52; 136/205; 431/80

(56) References Cited

U.S. PATENT DOCUMENTS

| | | | | |
|---|---|---|---|---|
| 369,219 A | * | 9/1887 | Woolley | 290/2 |
| 2,031,968 A | * | 2/1936 | Mathias | 290/52 |
| 4,367,413 A | * | 1/1983 | Nair | 290/52 |
| 4,394,582 A | * | 7/1983 | Kreissl et al. | 290/2 |
| 4,470,476 A | * | 9/1984 | Hunt | 180/65.2 |
| 4,739,180 A | * | 4/1988 | Yanoma et al. | 290/2 |
| 5,376,827 A | * | 12/1994 | Hines | 290/52 |
| 5,793,119 A | * | 8/1998 | Zinke | 290/2 |

* cited by examiner

Primary Examiner—Burton S. Mullins
(74) Attorney, Agent, or Firm—Kirkpatrick & Lockhart LLP

(57) ABSTRACT

A power generation system. The system includes a magnetically-actuated turbine having a rotating shaft and a generator connected to the turbine. The generator includes a rotor connected to the rotating shaft, a stator co-axially aligned with the rotor, at least one brush connected to the rotor and extending to an inner surface of the stator, at least one thermoelectric junction on an outer surface of the stator, and a hard magnetic casing co-axially aligned with the stator.

26 Claims, 5 Drawing Sheets

POWER GENERATION SYSTEM

CROSS-REFERENCE TO RELATED APPLICATION

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to power generation systems.

2. Description of the Background

The largest heat engines in modern society are the steam engines used in electric power plants to drive an AC generator and produce electricity. About eighty-five percent of the electricity in the United States is produced by such steam engines—the other fifteen percent being generated by water power in hydroelectric plants.

In a typical steam electric power plant, a heat source is used to heat water in a boiler. The heat source is usually either the combustion of a fossil fuel such as coal, oil, or natural gas, or the fission of uranium 235. The heated water in the boiler is converted into high-temperature, high pressure steam. Nuclear power plants typically have a reactor core in which water is heated into steam. The steam expands and cools as it passes through a turbine, converting the heat energy into mechanical energy of a rotating shaft of the turbine. The rotating shaft of the turbine drives a generator which converts the mechanical energy into electrical energy, typically AC, that is supplied to energy customers via a power distribution system.

Such power plants are rather inefficient. Indeed, the typical efficiencies for steam electric plants are about forty percent. Moreover, these types of power plants contribute to the usurpation of precious natural resources.

Accordingly, there exists a need for alternative power generation sources.

SUMMARY OF THE INVENTION

According to one embodiment, the present invention is directed to a power generation system. The system includes a magnetically-actuated turbine having a rotating shaft and a generator connected to the turbine. The generator includes a rotor connected to the rotating shaft, a stator co-axially aligned with the rotor, at least one brush connected to the rotor and extending to an inner surface of the stator, at least one thermoelectric junction on an outer surface of the stator, and a hard magnetic casing co-axially aligned with the stator.

In contrast to prior art power generation systems, the present invention provides an efficient mechanism for powering devices requiring electrical energy. According to one embodiment, the power generation system of the present invention may be advantageously used to power, for example, a house or an automobile, with a relatively small DC voltage source. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
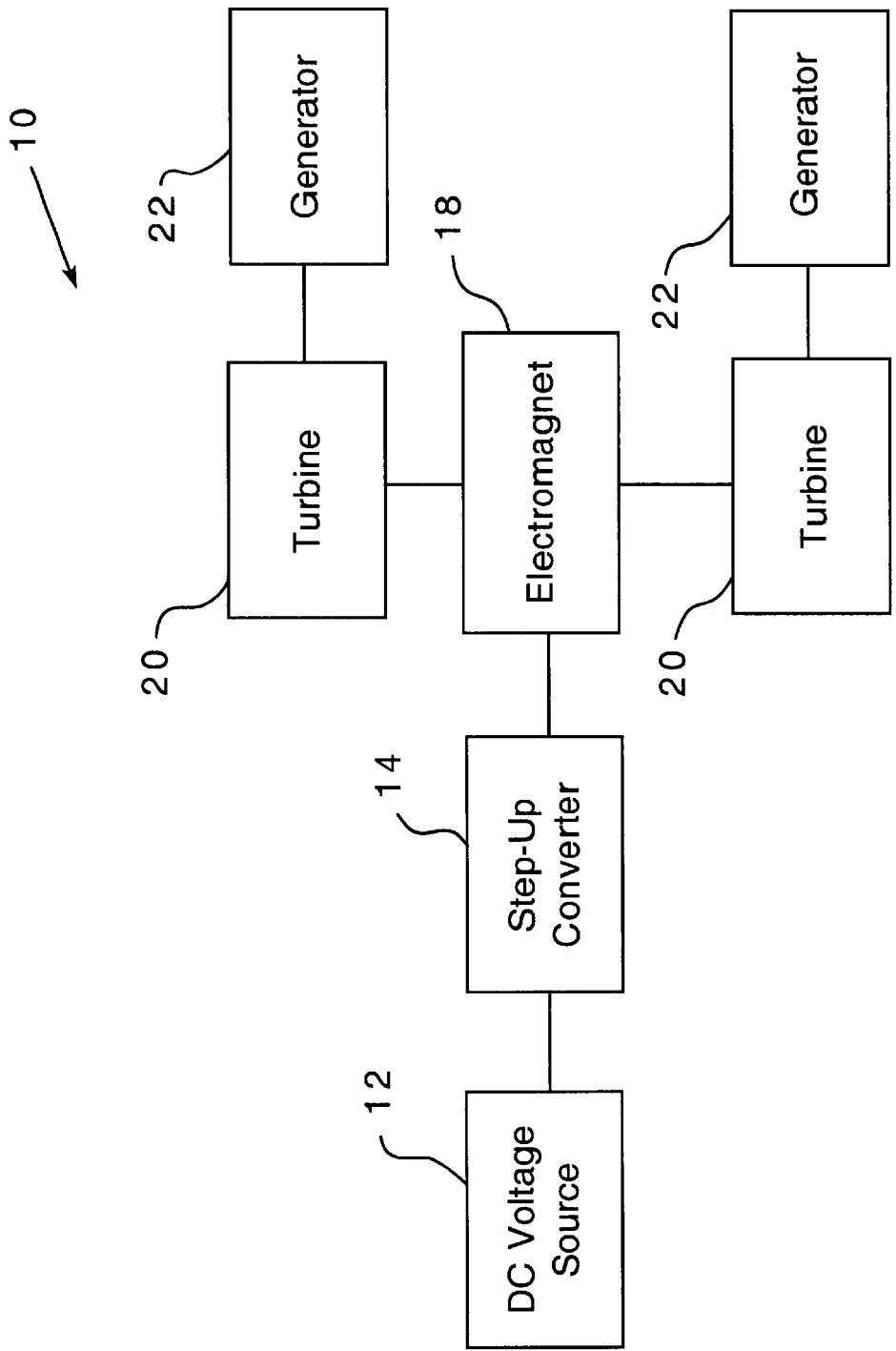
FIG. 1 is a block diagram of a power generation system according to one embodiment of the present invention.

FIG. 1 is a block diagram of a power generation system 10 according to one embodiment of the present invention. The system 10 includes a DC voltage source 12, a step-up converter 14, an electromagnet 18, a pair of turbines 20, and a pair of generators 22. According to one embodiment, as described further hereinbelow, the step-up converter 14 may up-convert an input voltage from the DC voltage source 12 to a higher voltage. The stepped-up voltage from the step-up converter 14 may be coupled to a coil of the electromagnet 18. An opposite magnetic polarization between the electromagnet 18 and a head portion of the respective turbines 20 drives the turbines 20, which in turn drives a rotor of the respective generators 22. As described further hereinbelow, thermoelectric junctions on a surface of the stator of the generators 22 may convert the heat generated by rotation of the rotors into electrical energy. In addition, the magnetic field from a hard magnetic outer casing of the generators 22, co-axially aligned with the stator of the respective generator 22, may prevent thermal energy from being dissipated by the generators 22. The electrical energy from the thermoelectric junctions may be used to power devices (not shown) requiring electrical energy. A transformer (not shown) may be coupled to the output of the generators 22 to develop the appropriate voltages for the devices driven by the generator 22.

The DC voltage source 12 may be, for example a re-chargeable battery such as, for example, a nickel cadmium (NiCd) battery, a nickel metal hydride (NiMH) battery, a sealed lead acid (SLA) battery, a lithium ion (Li-ion) battery, a lithium polymer (Li-polymer) battery, or a reusable alkaline battery. According to one embodiment, the DC voltage source 12 may be a 1.5 V battery.

The step-up converter 14 may be, for example, any type of circuit used to up-convert an input DC voltage to a desired output DC voltage. The output of the step-up converter 14 is coupled to the coil of the electromagnet 18. According to one embodiment in which the DC voltage source 12 is a 1.5 V battery, the step-up converter 14 may supply, for example, 800 to 1000 V to the coil of the electromagnet 18. The amount of current supplied to the electromagnet 18 may depend upon the power capacity of the DC voltage source 12, and may be relatively low.

Figure 2:
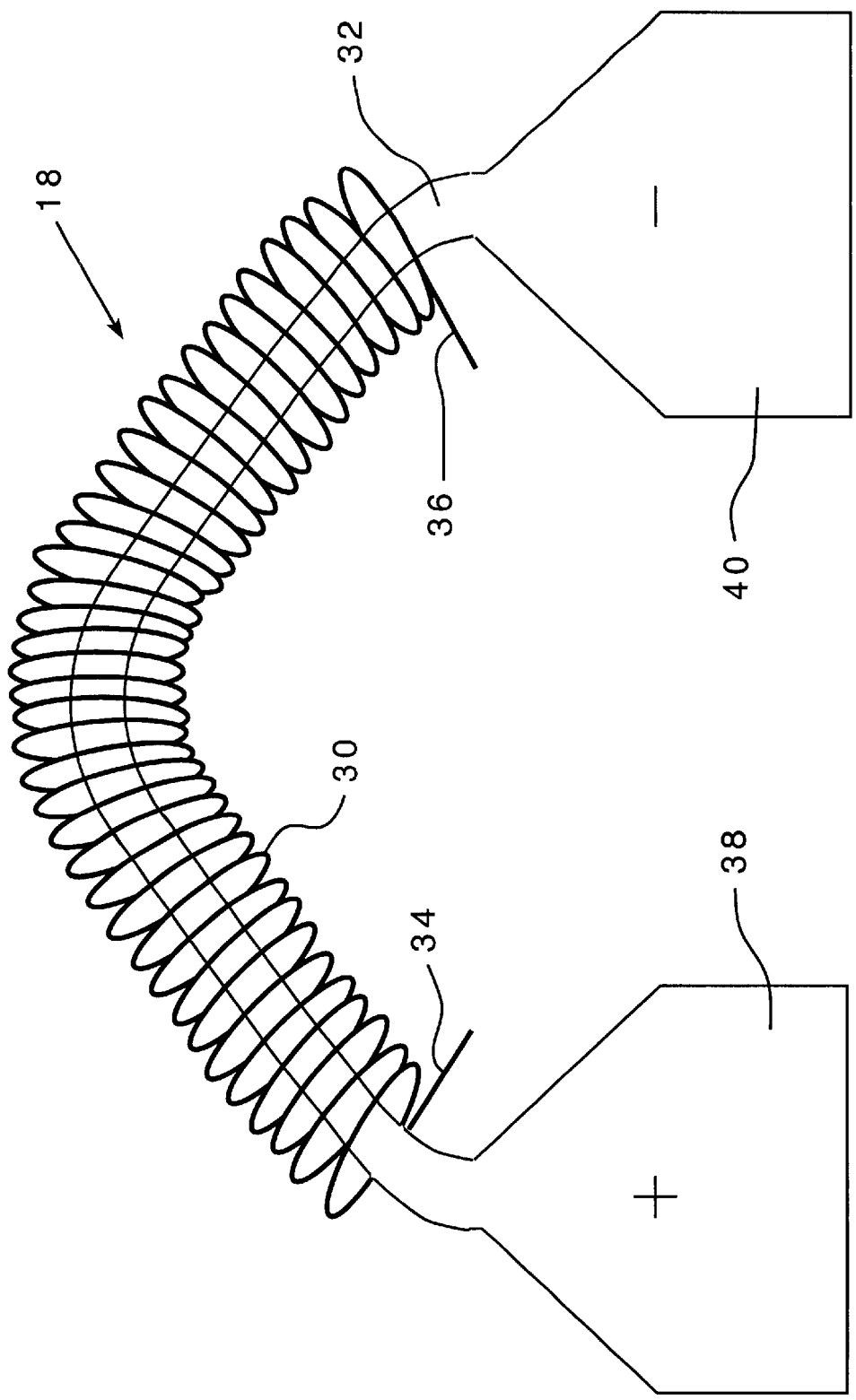
FIG. 2 is a diagram of an electromagnet of the power generation system of FIG. 1 according to one embodiment of the present invention.

FIG. 2 is a diagram of the electromagnet 18 according to one embodiment of the present invention. The electromagnet 18 includes a coil 30 and a core 32. End terminals 34, 36 of the coil 30 may be coupled to the output of the step-up converter 14. According to one embodiment, the electromagnet 18 may have a substantially V-shaped configuration as illustrated in FIG. 2. The coil 30 may constructed of, for example, 16-guage copper wire, and may include, for example, approximately one thousand turns and may have a length of, for example, approximately 1.3 meters. The core 32 may be fabricated from a soft magnetic material such as, for example, hard iron or nickel iron (NiFe). Each end of the core 32 may have a dome 38, 40 defining a cavity in which the head portions of the respective turbines 20 may be disposed, as discussed further hereinbelow. When the coil 30 is energized by the output from the step-up converter 14, the coil 30 generates a magnetic field, thereby magnetizing the core 32. The domes 38, 40, at opposite ends of the core 32, thus have opposite magnetic polarities, as indicated in FIG. 2.

Figures 3, 4:
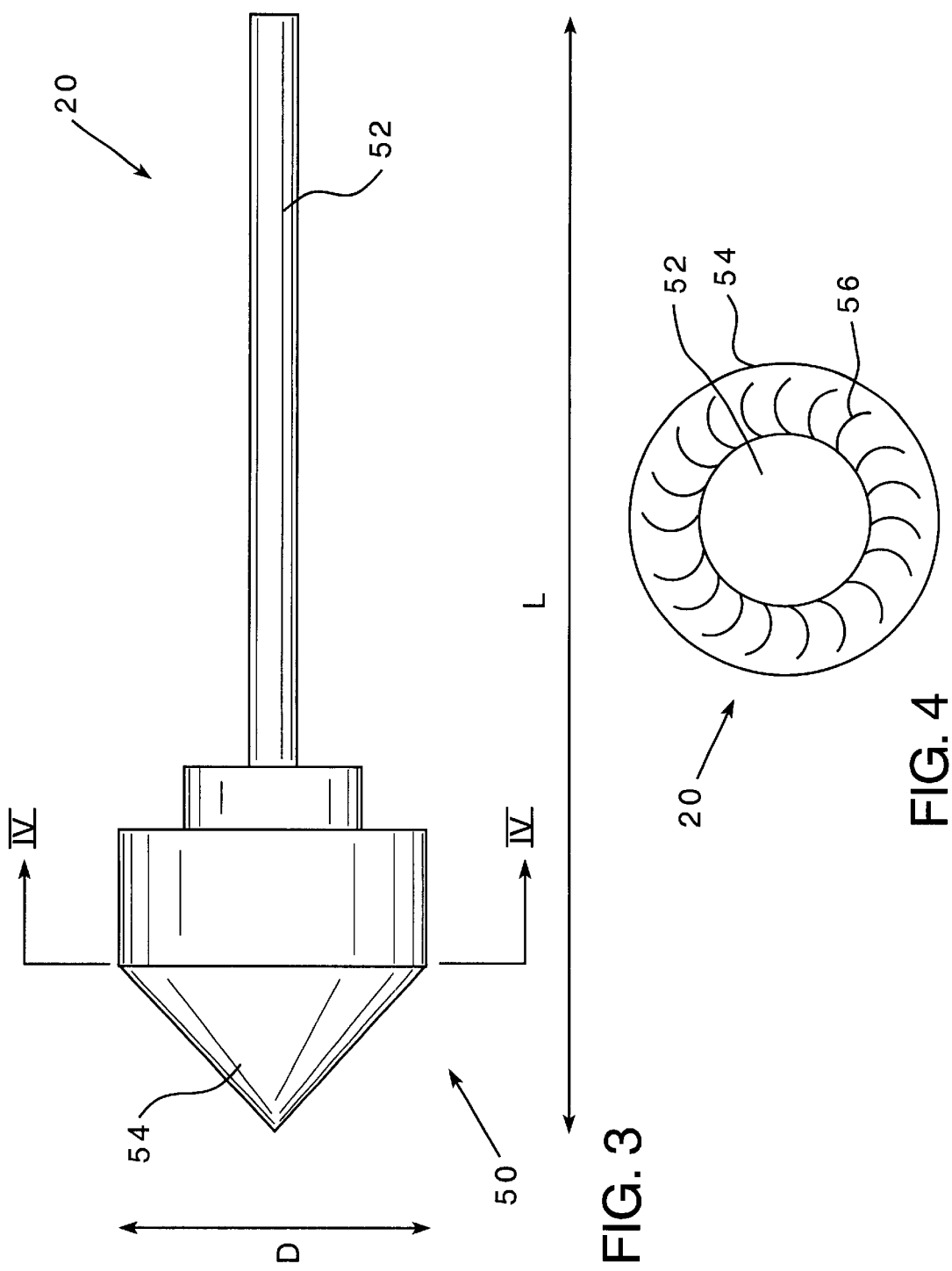
FIG. 3 is a side view of one of the turbines of the power generation system of FIG. 1 according to one embodiment of the present invention.
FIG. 4 is a cross-sectional view of the turbine of FIG. 3 according to one embodiment of the present invention.

FIGS. 3 and 4 are diagrams of one of the turbines 20 according to one embodiment of the present invention. According to one embodiment, each of the turbines 20 of the power generation system 10 may be substantially the same. Therefore, a description of only one of the turbines 20 is provided herein. FIG. 3 is side view of the turbine 20 and FIG. 4 is a cross-sectional front view of the turbine 20 along line IV—IV in FIG. 3. The turbine 20 may include a head portion 50 and a shaft 52. The head portion 50 includes a cover 54 and a number of airfoils 56 connected to a first end of the shaft 52, such that the cover 54 encloses the airfoils 56. The cover 54 and the shaft 52 may be constructed of magnetically non-conductive materials such as, for example, aluminum. The airfoils 56 may be constructed of a hard (permanent) magnetic material such as, for example, AlNiCo. The second end of the shaft 52 of the turbine 20 may be connected to the rotor of the generator 22, and may include teeth (not shown) for engaging the rotor. According to one embodiment, each turbine 20 may have a length L of, for example, twenty-nine inches. The diameter of the head portion 50 of the turbines 20 may be, for example, fourteen inches. In addition, the airfoils 56 may have a twist of, for example, forty-five degrees.

According to one embodiment, as discussed hereinbefore, the head portion 50 of the first turbine 20 may be disposed within the cavity defined by the dome 38 of the electromagnet 18, and the head portion 50 of the second turbine 20 may be disposed in within the cavity defined by the dome 40 of the electromagnet 18. The airfoils 56 of the respective turbines 20 may be oppositely magnetized in relation to the magnetization of the domes 38, 40. That is, for example, the airfoils 56 of the first turbine 20 disposed within the dome 38 may have a negative magnetization, and the airfoils 56 of the second turbine 20 disposed within the dome 40 may have a positive magnetization. Thus, when the coil 30 of the electromagnet 18 is energized, the magnetic attraction between the airfoils 56 of the respective turbines 20 and the domes 38, 40 of the electromagnet 18 may cause the shafts 52 of the respective turbines 20 to rotate. According to one embodiment, the shafts 52 may rotate at 1750 r.p.m. The domes 38, 40 and the turbines 20 may be configured such that they are air-tight. Consequently, the airfoils 56 of the respective turbines 20 may experience minimal air resistance, and therefore experience less friction.

Figure 5:
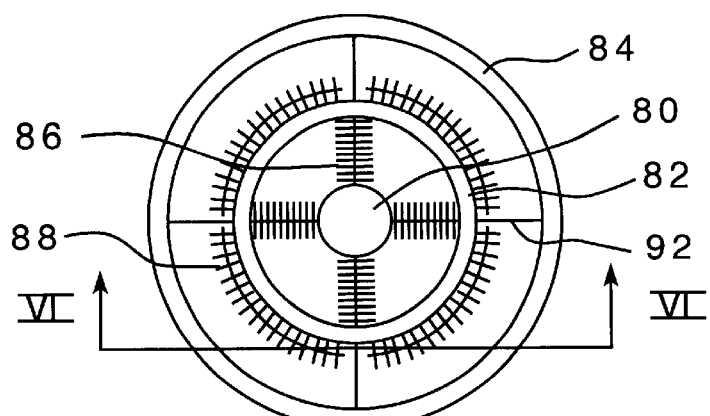
FIG. 5 is a front view of one of the generators of the power generation system of FIG. 1 according to one embodiment of the present invention.
Figure 6:
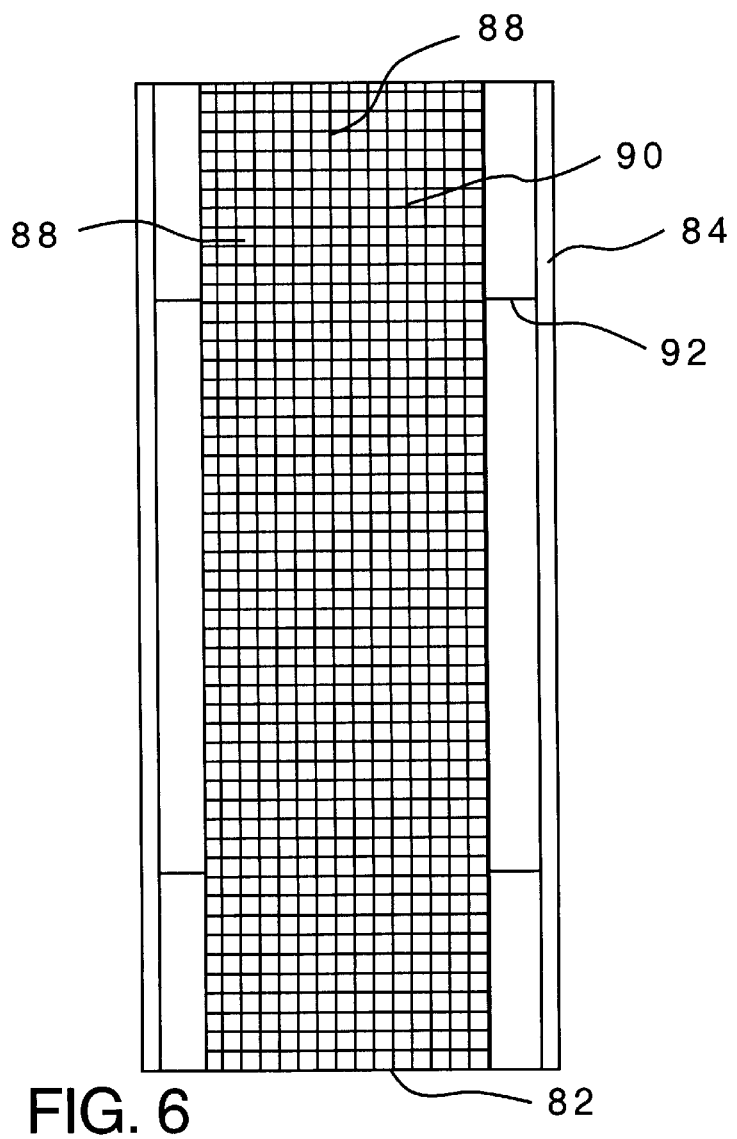
FIG. 6 is a cross-sectional side view of the generator of FIG. 5 according to one embodiment of the present invention.

FIGS. 5 and 6 are diagrams of one of the generators 22 according to one embodiment of the present invention. The generators 22 of the power generation system 10 may be substantially the same. Therefore, only one of the generators 22 is described herein. FIG. 5 is a front view of the generator 22 and FIG. 6 is a cross-sectional side view along line VI—VI of FIG. 5. The generator 22 may include a rotor 80, a stator 82, and a casing 84. According to one embodiment, the rotor 80, the stator 82, and the casing 84 may be co-axially aligned. The rotor 80 may include teeth (not shown) for engaging the teeth of the shaft 52 of the turbine 20, such that the rotor 80 rotates with the shaft 52. According to one embodiment, the rotor 80 and the stator 82 may be made from a laminated high-grade magnetic fill material. The generator 22 may also include a number of brushes 86 connected to the rotor 80 and extending to an inner surface of the stator 82. The brushes 86 may be, for example, coils of copper having, for example, one thousand turns each. The brushes 86 may rotate with the rotor 80, generating frictional heat energy as they brush along the inner surface of the stator 82.

The outer surface of the stator 82 may have a number of wires 88 connected thereto forming a number of intersecting junctions 90. A first portion of the wires 88 (such as, e.g., the vertical wires 88 in FIG. 6) may be of a first material and a second portion of the wires 88 (such as, e.g., the horizontal wires in FIG. 6) may be of a second material, such that the junctions 90 are thermoelectric junctions that generate a voltage potential from the heat caused by the rotating brushes 86. For example, according to one embodiment, the first portion of the wires 88 may be copper wires and the second portion of the wires 88 may be cadmium wires. According to another embodiment, the first portion of the wires 88 may be iron and the second portion of the wires 88 may be constantan.

The casing 84 may be constructed of a hard (permanent) magnetic material such as, for example, AlNiCo. The permanent magnetic field from the hard magnetic casing 84 may prevent heat caused by rotation of the brushes 86 from escaping from the generator 22. The heat maintained within the casing 84 may be converted to electrical energy by the thermoelectric junctions 90.

A number of supports 92 may be provided between the stator 82 and the casing 84 to maintain the spacing therebetween. The supports 92 may be constructed of a heat-resistant material such as, for example, silicon.

As illustrated in FIG. 6, the first and second portions of the wires 88 may be oriented orthogonally. According to other embodiments of the present invention, the wires 88 may be configured according to other patterns such that there is a sufficient number of thermoelectric junctions 90 to convert the heat generated by the generator 22 into electrical energy. For example, according to another embodiment, the wires 88 may be wound in a helical pattern.

Figures 7, 8:
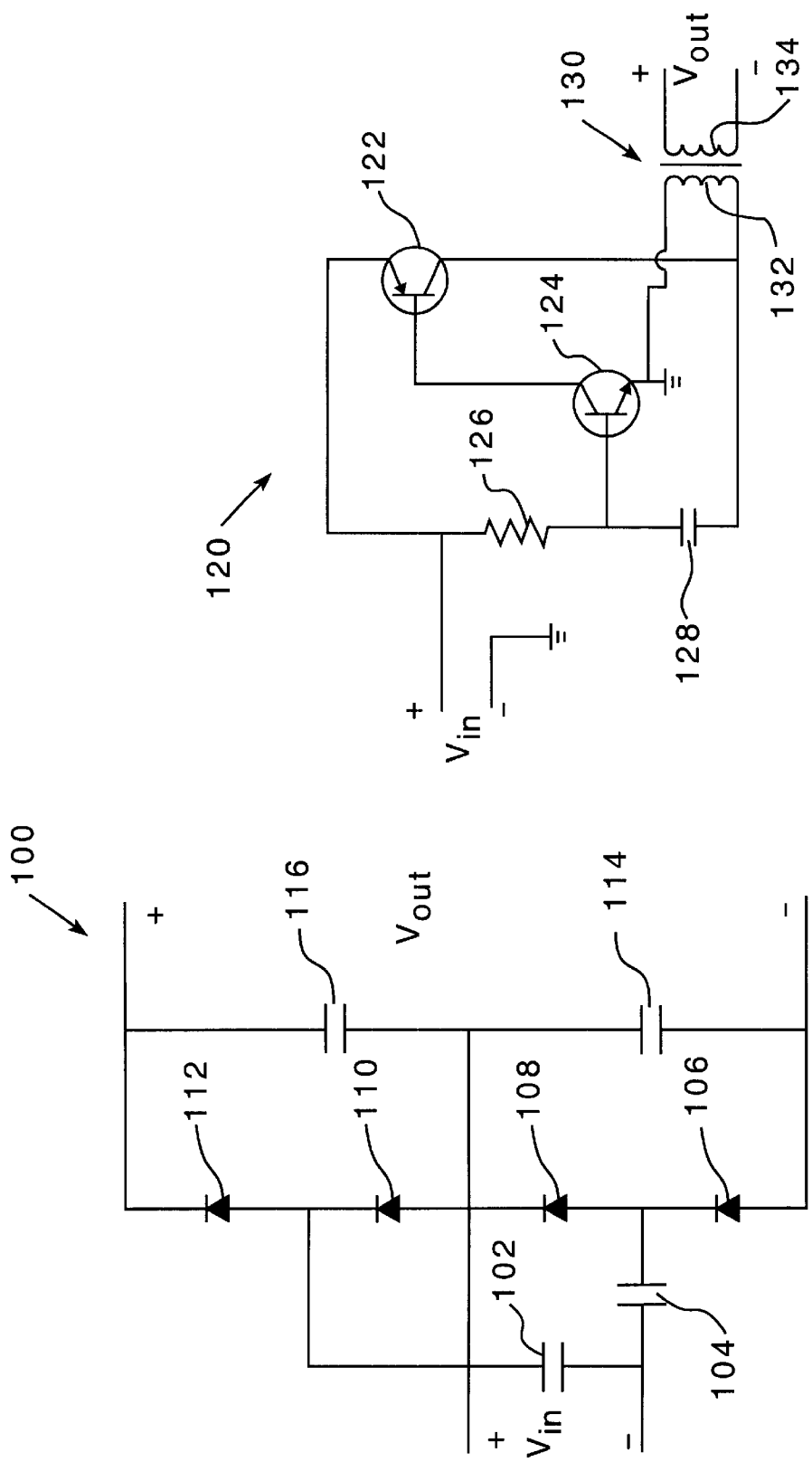
FIG. 7 is a schematic diagram of a circuit that may be utilized as a stage of the step-up converter of the power generation system of FIG. 1 according to one embodiment of the present invention.
FIG. 8 is a schematic diagram of another circuit that may be utilized as a stage of the step-up converter of the power generation system of FIG. 1 according to an embodiment of the resent invention.

As discussed hereinbefore, the step-up converter 14 may upconvert the DC voltage from the DC voltage source 12 to a much higher DC voltage, which is coupled to the coil 30 of the electromagnet 18. According to one embodiment, the step-up converter 14 may include a number of cascaded stages. According to one embodiment, certain stages of the step-up converter 14 may include a circuit including a capacitor-diode network. FIG. 7 is a schematic diagram of a capacitor-diode network circuit 100 that may be used as one stage of the step-up converter 14 according to one embodiment of the present invention. The circuit 100 includes a pair of input capacitors 102, 104, a number of series-connected diodes 106, 108, 110, 112, and a pair of output capacitors 114, 116. The input voltage Vin to the circuit 100 may be, for example, from the DC power source 12 if the circuit is the first stage of the step-up converter 14 or it may be from a foregoing stage of the step-up converter 14. The output voltage Vout of the circuit 100 is the voltage across the output capacitors 114, 116.

FIG. 8 is a schematic diagram of a circuit 120 that may also be used as one of the stages of the step-up converter 14. The circuit 120 illustrated in FIG. 8 includes a pair of transistors 122, 124, a resistor 126, a capacitor 128, and a transformer 130 including a primary winding 132 magnetically coupled to a secondary winding 134. The transistors 122, 124 may be, for example, bipolar junction transistors (BJTs) as illustrated in FIG. 8. The emitter terminal of the first transistor 122 is coupled to a first terminal of the resistor 126. The second terminal of the resistor 126 is coupled to the base terminal of the second transistor 124. The base terminal of the first transistor 122 is coupled to the collector terminal of the second transistor 124. The collector terminal of the first transistor 122 and the emitter terminal of the second transistor 124 are connected to opposite ends of the primary winding 132 of the transformer 130. The output voltage Vout across the secondary winding 134 may be supplied to, for example, a subsequent stage of the step-up converter or the coil 30 of the electromagnet.

According to one embodiment of the present invention, the step-up converter 14 may include, for example, five cascaded stages. According to such an embodiment, the first three stages of the step-up converter 14 may include the capacitor-diode network of the circuit 100 of FIG. 7 and the second two stages may include the circuit 120 of FIG. 8. For such an embodiment, the first three stages may quadruple the voltage supplied from the DC voltage source 12. Thus, for example, where the DC voltage source 12 is a 1.5 V battery, the output voltage from the third stage may be 6 V. The subsequent two stages of the step-up converter may convert the 6 V from the first three stages to a DC output voltage of, for example, 800–1000 V, which is supplied to the coil 30 of the electromagnet 18.

For an embodiment in which coil 30 is energized with 800 V, the magnetomotive force of the electromagnet 18 may cause the turbines 20 to rotate at, for example, 1750 r.p.m. As such, the result power from each of the generators 22 may be on the order of, for example, thousands of kilo watts. This power may be used to power devices requiring electrical energy. A transformer (not shown), such as a shell-type transformer, may be connected to the output of each of the respective generator 22 to step up or down the voltage from the generator 22. In addition, the power from the generators 22 may be used to recharge the DC voltage source 12.

Although the present invention has been described herein with respect to certain embodiments, those of ordinary skill in the art will recognize that many modifications and variations of the present invention may be implemented. For example, the transformer 130 of the circuit 120 illustrated in FIG. 8 may include multiple primary, secondary, or tertiary windings. In addition, the materials disclosed are illustrative and not exhaustive. Other materials may be used to make devices embodying the present invention. The foregoing description and the following claims are intended to cover all such modifications and variations.

What is claimed is:

1. A power generation system, comprising:
    a magnetically-actuated turbine having a rotating shaft; and
    a generator connected to the turbine, wherein the generator includes:
        a rotor connected to the rotating shaft;
        a stator co-axially aligned with the rotor;
        at least one brush connected to the rotor and extending to an inner surface of the stator;
        at least one thermoelectric junction on an outer surface of the stator; and
        a hard magnetic casing co-axially aligned with the stator.

2. The system of claim 1, wherein the generator further includes at least one heat-resistant support between the casing and the outer surface of the stator.

3. The system of claim 1, wherein the thermoelectric junction includes a junction having a first wire and a second wire.

4. The system of claim 3, wherein the first wire includes copper and the second wire includes cadmium.

5. The system of claim 3, wherein the first wire includes iron and the second wire includes constantan.

6. The system of claim 1, further comprising an electromagnet including a coil and a core, wherein a first end of the core includes a dome defining a cavity, and wherein a head portion of the turbine is disposed within the cavity.

7. The system of claim 6, wherein the head portion of the turbine includes a plurality of permanent magnetic airfoils, such that the airfoils have a magnetization that is opposite a magnetization of the dome when the coil of the electromagnet is energized.

8. The system of claim 6, further comprising:
    a DC voltage source; and
    a DC-DC step-up converter having an input connected to the DC voltage source and an output connected to the coil of the electromagnet.

9. The system of claim 8, wherein the DC voltage source includes a battery.

10. The system of claim 6, wherein a second end of the core of the electromagnet includes a second dome defining a cavity, and further comprising:
    a second magnetically-actuated turbine having a head portion and a rotating shaft, wherein the head portion is disposed within the cavity of the second dome; and
    a second generator having a rotor connected to the rotating shaft of the second turbine.

11. The system of claim 10, wherein the second generator includes:
    a rotor connected to the rotating shaft of the second turbine;
    a stator co-axially aligned with the rotor;
    at least one brush connected to the rotor and extending to an inner surface of the stator;
    at least one thermoelectric junction on an outer surface of the stator; and
    a hard magnetic casing co-axially aligned with the stator.

12. A power generation system, comprising:
    an electromagnet including a coil and a core, wherein a first end of the core includes a dome defining a cavity;
    a turbine having a head portion and a rotating shaft, wherein the head portion of the turbine is disposed within the cavity, and wherein the head portion includes a plurality of permanent magnetic airfoils, such that the airfoils have a magnetization that is opposite a magnetization of the dome when the coil of the electromagnet is energized; and
    a generator connected to the turbine, wherein the generator includes:

a rotor connected to the rotating shaft;

a stator co-axially aligned with the rotor;

at least one brush connected to the rotor and extending to an inner surface of the stator;

at least one thermoelectric junction on an outer surface of the stator; and a hard magnetic casing co-axially aligned with the stator.

13. The system of claim 12, wherein a second end of the core of the electromagnet includes a second dome defining a cavity, and further comprising:

a second turbine having a head portion and a rotating shaft, wherein the head portion is disposed within the cavity of the second dome, and wherein the head portion includes a plurality of permanent magnetic airfoils, such that the airfoils have a magnetization that is opposite a magnetization of the second dome when the coil of the electromagnet is energized; and a second generator having a rotor connected to the rotating shaft of the second turbine.

14. The system of claim 13, wherein the electromagnet is V-shaped.

15. The system of claim 12, further comprising:

a DC voltage source;

a DC-DC step-up converter having an input connected to the DC voltage source and an output connected to the coil of the electromagnet.

16. A generator, comprising:

a rotor;

a stator co-axially aligned with the rotor;

at least one brush connected to the rotor and extending to an inner surface of the stator;

at least one thermoelectric junction on an outer surface of the stator; and a hard magnetic casing co-axially aligned with the stator.

17. The generator of claim 16, further comprising at least one heat-resistant support between the casing and the outer surface of the stator.

18. The generator of claim 16, wherein the thermoelectric junction includes a junction having a first wire and a second wire.

19. The generator of claim 18, wherein the first wire includes copper and the second wire includes cadmium.

20. The generator of claim 18, wherein the first wire includes iron and the second wire includes constantan.

21. A power generation system, comprising:

electromagnetic means for rotating a turbine having a shaft;

means for generating heat from rotation of the shaft of the turbine;

means for preventing radiation of the heat; and means for converting the heat to electrical energy.

22. The power generating system of claim 21, further comprising means for energizing the electromagnetic means.

23. A method, comprising:

energizing a coil of an electromagnet such that a turbine having a head portion disposed within a cavity defined by a dome of the electromagnet is caused to rotate;

converting rotation of the shaft to heat energy;

preventing radiation of the heat energy; and converting the heat energy to electrical energy.

24. The method of claim 23, wherein energizing the coil of the electromagnet includes energizing the coil with a DC voltage.

25. The method of claim 23, wherein converting the heat energy to electrical energy includes converting the heat energy to electrical energy with at least one thermoelectric junction.

26. The method of claim 25, wherein preventing radiation of the heat energy includes enclosing the thermoelectric junction with a permanent magnetic casing.

* * * * *